United States Patent [19]
Patino et al.

[11] Patent Number: 4,885,184
[45] Date of Patent: Dec. 5, 1989

[54] PROCESS FOR PREPARING MALT LIQUEUR

[75] Inventors: Hugo Patino, Lakewood; George E. Heard, Golden; Finn B. Knudsen, Lakewood; H. Stephen Gress, Westminster, all of Colo.

[73] Assignee: Adolph Coors Company, Golden, Colo.

[21] Appl. No.: 209,508

[22] Filed: Jun. 21, 1988

[51] Int. Cl.$^4$ .................................................. C12G 3/06
[52] U.S. Cl. ..................................... 426/592; 426/384
[58] Field of Search ............... 426/592, 384, 386, 327, 426/330.4, 11, 12, 14

[56] References Cited

U.S. PATENT DOCUMENTS

| | | | |
|---|---|---|---|
| 3,285,025 | 11/1966 | Shaul | 426/384 |
| 3,323,919 | 6/1967 | Malick | 426/384 |
| 3,821,418 | 6/1974 | Kosano | 426/384 |
| 4,265,920 | 5/1981 | Thijssen | 426/14 |
| 4,468,407 | 8/1984 | Vella | 426/592 |
| 4,687,671 | 8/1987 | Husain | 426/384 |
| 4,765,147 | 8/1988 | Adachi | 426/592 |

FOREIGN PATENT DOCUMENTS

| | | | |
|---|---|---|---|
| 727683 | 4/1980 | U.S.S.R. | 426/592 |
| 896066 | 1/1982 | U.S.S.R. | 426/592 |
| 926007 | 5/1982 | U.S.S.R. | 426/592 |
| 968065 | 10/1982 | U.S.S.R. | 426/592 |
| 990805 | 1/1983 | U.S.S.R. | 426/592 |
| 1017720 | 5/1983 | U.S.S.R. | 426/592 |

*Primary Examiner*—Carolyn Paden
*Attorney, Agent, or Firm*—Klaas & Law

[57] ABSTRACT

A process for preparing a malt liqueur from a fermented wort initially comprising at least about 40% by weight barley malt. The process comprises an initial filtration of the fermented wort to provide an essentially particulate-free liquid comprising alcohol and water. The liquid is freeze concentrated to produce a concentrated alcohol liquid base to which can be added and mixed natural or synthetic flavorings to thereby produce a liqueur product.

3 Claims, No Drawings

PROCESS FOR PREPARING MALT LIQUEUR

BACKGROUND OF THE INVENTION

This invention relates to a process for preparing a malt-based liqueur, and employs a freeze concentration step in attaining an increased alcohol content.

Liqueurs, such as Irish-style creams and those flavored with peach, orange, cherry, coffee and the like, are made chiefly by distilling the alcohol and the flavor compounds in mixture therewith. The distillation process removes a quantity of water and thereby permits attainment of the relatively-high alcohol content commonly present in these beverages. However, because employment of a distillation process to concentrate alcohol content in a malt-based beverage adversely affects its palatable qualities, malt beverages have not been looked upon in the past as viable precursors for liqueur products.

The use of a freeze concentrator apparatus to accomplish removal of a quantity of water from a liquid is presently recognized for various applications. For example, frozen orange juice concentrate is produced by a freeze concentration operation whereby fresh orange juice has much of its water removed by cooling to a temperature where water turns to ice which is then removed from the juice product. The resultant concentrated juice is then frozen for subsequent thawing and water reconstitution. In addition to removing water, freeze concentration has been employed to also include a portion of alcohol being removed with water from a liquid as described by Vella in U.S. Pat. No. 4,468,407 to thereby produce a low-alcohol beverage in the subsequently-melted extrudate. Malick, in U.S. Pat. No. 3,323,919, describes the use of freeze concentration to remove water from reduced-hops beer and produce a unique, directly-consumable, high-alcohol beverage. Thus, freeze concentration has been employed to alter water or water-and-alcohol content in a beverage. Khudenko et al., in U.S. Pat. No. 4,713,102, describes a method and apparatus for freeze concentrating a liquid containing volatile and non-volatile components by mixing a liquid refrigerant gas with the liquid in a manner to retain volatile components in the concentrated end product.

It has now been found that freeze concentration can be employed in the preparation of a flavored liqueur product having a malt-based precursor or wort, thereby allowing production of a liqueur from a malted barley without the toward effects of distillation normally required in traditional liqueur production. Accordingly, a primary object of the present invention is to prepare a flavored liqueur from a malt-based precursor. A further object of the present invention is to employ freeze concentration in achieving a desired alcohol content in the liqueur. Another object of the present invention is to provide a broad scope of flavored liqueurs produced from a single malt-based precursor. These and other objects of the invention will become apparent throughout the description which follows.

SUMMARY OF THE INVENTION

The present invention is a process for preparing a malt liqueur from a fermented wort produced from a mash initially comprising at least about 40% by weight of barley malt. The process comprises an initial filtration and treatment of the fermented wort to thereby provide a liquid comprising alcohol and water which can be freeze concentrated. The liquid is then cooled sufficiently to produce a quantity of ice crystals formed from water in the liquid, thereby increasing the alcohol concentration in the liquid by freeze concentration. Depending upon the alcohol concentration desired, the magnitude of cooling to effect such freeze concentration is varied. Finally, the ice crystals are separated from the liquid and at least one flavoring agent is mixed into the liquid. Additionally, and depending upon desired sweetness, a sweetening agent can also be mixed into the liquid. Alternatively or additionally, at least one flavoring agent can be mixed into the liquid prior to freeze concentration to thereby produce a flavored liqueur end-product immediately upon completion of freeze concentration. The inventive process here described thus provides for production of broad variety of liqueurs utilizing malt-based precursors without a requirement for distillation.

DETAILED DESCRIPTION OF A PREFERRED EMBODIMENT

The present invention is a process for preparing a malt-based liqueur from a fermented wort produced from a mash initially comprising at least about 40 wt. % barley malt. The fermented wort is filtered and treated to provide a liquid comprising alcohol and water which can be freeze concentrated. This liquid is then cooled sufficiently to cause freeze concentration thereof by freezing a portion of the water therein and thereby concentrate the alcohol content of the liquid. The liquid is separated from the ice crystals thus formed, and at least one flavoring agent is mixed with the liquid to produce a flavored liqueur made from a malt base without distillation.

The brewing process employed to produce the fermented wort can be varied according to the physical and flavor characteristics desired in the liquid to be concentrated, and can be brewed in a variety of ways depending on the facilities available for production. A classical American approach involves preparing a grist composed of 50±10% by weight milled barley malt and 50±10% by weight milled grain adjuncts (e.g. rice or corn). The use of up to 100% milled barley malt is also possible. The grist is conventionally cooked at appropriate temperature and time intervals so as to extract the maximum amount of fermentable carbohydrate from the grist. The resulting extract may be boiled as is, with or without hops, and may be supplemented with fermentable sugar syrups to achieve the desired wort gravity. Typical wort gravities will range from 10° to 22° Plato, though these values may easily be exceeded with appropriate adjustments to materials and processes. The amount and type of hops boiled with the extract to produce the wort will vary with the gravity desired for the wort as well as the flavor effect desired in the subsequent concentrated base. If hops are used, they may be added any time during the wort boil.

An alternative approach for brewing can be used. This involves the use of enzymes such as amyloglucosidase or glucoamylase. The origin of these enzymes is bacterial or fungal fermentations. The enzymes are introduced during either the brewing or the fermentation process. The resulting liquid contains a higher proportion of sugars fermentable by the yeast, and thus results in a lower residual sugar content in the fermented liquid. This can result in substantial differences in the ratio of alcohol to extract in the final product.

Another variation of the classical approach is the use of a fraction of unmalted barley. To compensate for the reduction in enzyme activity in the grist, bacterial or fungal enzyme preparations can be introduced. These typically comprise amylases, proteases, glucanases and cellulases, and can be added during the cooking procedure.

The resulting liquid is cooled to 7°–11° C., aerated with sterile compressed air or oxygen, and Saccharomvces sp. yeast is introduced at a rate of 10 to 30 million cells of yeast per ml. of liquid. Control of the fermentation is achieved by maintaining the temperature of the fermenting liquid between about 7° to about 18° C., such that adequate levels of esters, carbonyls and alcohols result during a residence time of 5 to 15 days. Alternatively, a continuous fermentation process can be employed by immobilizing the yeast in a matrix and circulating the product to provide a residence time of 8 to 24 hours. Once the fermentable sugars have been depleted from the liquid by the yeast, the yeast is removed from the media by sedimentation, centrifugation or filtration. Depending upon the desired levels of flavor compounds, the resultant fermented liquid may be put through a process of secondary fermentation by the reintroduction of yeast and fermentable sugars, followed by a slow fermentation at temperatures at 8° or lower, and applying carbon dioxide or nitrogen counterpressure. The fermentability of the liquid can also be enhanced by the use of malt powders with sufficient enzyme activity to promote further breakdown of the unfermentable starches to fermentable sugars.

Treatment of the liquid to prepare it for freeze concentration is then provided. This includes adjusting the carbonation level, and one or several filtration steps using diatomaceous earth, cellulose-based, or ceramic filters to provide adequate crystal formation and growth. Additional treatment prior to concentration may be required depending upon the desired final product characteristics. This includes the use of activated carbon to modify color or flavor components. Unique characteristics can be provided to this liquid by the addition at this point of the production process of extract featuring a variety of fruit and spice flavors. Alternatively or additionally, flavoring can be added after concentration has been accomplished, as described later.

The liquid is then ready to be concentrated by the removal of water by means of a conventional freeze concentrator employing heat exchange. This is accomplished by cooling the liquid to its freezing temperature in a scraped-surface heat exchanger where crystals with a small diameter are formed. This slurry of crystals is taken to a stirred tank where the crystals are allowed to grow by providing the appropriate conditions of temperature, pressure and residence time. A fraction of the slurry is removed from the stirred tank and put through a fine filter with a scraper blade. Here, the retained ice crystals are washed with water and melted. The water has the composition of pure distilled water, with only traces of minerals, and this same water is used to wash the ice crystals. Thus, all of the components of the original liquid are retained except for the water that is progressively removed. As product concentration increases, the freeze concentrator operating conditions are modified to provide for continued crystal formation and growth. Once the required liquid concentration is achieved, steady state operation is initiated and collection of the concentrated liquid begins.

The following Table illustrates concentration levels (reported as percent weight by weight) of non-water constituents attainable for a fermented malt beverage.

| Liquids | Alcohol (% w/w) | Calories | Sugar Concentration (% w/w) |
|---|---|---|---|
| Initial | 8.0 | 264 | 4.89 |
| Conc. "A" | 10.5 | 345 | 6.39 |
| Conc. "B" | 12.5 | 411 | 7.62 |
| Conc. "C" | 14.2 | 468 | 8.64 |
| Conc. "D" | 16.4 | 540 | 9.99 |

Depending upon the type and level of sugars and proteins existing in the initial fermented liquid, higher concentrations of alcohol may be achievable. Post-treatment of the concentrated liquid includes the us of activated carbon to reduce color or flavor components, the storage at low temperature and filtration or centrifugation to remove oxalates, the adjustment of carbonation as desired, and the addition of flavoring agents to produce the final product.

In the Examples which follow, all percentages are by weight unless otherwise specified.

EXAMPLE 1

To prepare a concentrated alcohol base, a ratio of 60% ground barley malt and 40% corn grits is used. Of the total amount of barley malt used, 20% of it is introduced to a conventional cereal cooker in combination with the total amount of corn grits and the necessary amount of water to produce a mash. This mash is heated at a rate of loC per minute until a boil is reached. The remaining malt is introduced into a conventional mashing vessel where, in combination with water, it is warmed to 50° C. and held at that temperature for 30 minutes. The contents of the cereal cooker are then transferred to the mashing vessel, and the entire mixture is brought to a temperature of 68° C. where it is maintained for 45 minutes. After conversion of starch to sugar is verified, the resulting mash is filtered through a screen filter and the filtrate is boiled in a kettle for 90 minutes. If desired, a quantity of hops up to about 0.03% can be added during the boiling procedure. In this Example, however, no hops were added.

After boiling, the liquid is clarified in a whirlpool, chilled on a plate heat exchanger to 7° C., and aerated with sterile air to saturation, all as known in the art. The liquid is then pumped to a fermenting vessel, and, during pumping, yeast is added at a ratio of 16 million cells per ml. of liquid. After eight days at a controlled temperature setting of 12° C., the resulting fermented product is transferred to an aging vessel and there stored at a controlled temperature setting of 0° C. and a carbon dioxide counterpressure of 22 pounds. Most of the yeast is retained in the fermenting vessel and is not transferred to the aging vessel.

After aging, the resulting fermented wort is filtered with diatomaceous earth and activated charcoal. The liquid filtrate is processed in a freeze concentrator as earlier described to thereby produce a concentrated alcoholic liquid base. In the present example, a liquid base having an alcohol level of 26% by volume is produced. Of course, a concentrated base having a greater or lesser alcohol level can be produced by varying the concentration procedure as would be evident to the skilled artisan. Generally, about 20% to about 30% alcohol by volume is preferable for the liquid base alcohol concentration. Ninety grams of this base is mixed with about 10 to 20 grams (preferably about 16 grams) of sucrose to produce a mixture to which a variety of natural or synthetic flavoring agents can be added and mixed to yield a uniquely-flavored 47-proof Schnapps-type liqueur product. Flavoring agents which can be added include peach, pear, apple, pineapple, amaretto, orange, brandy, Irish coffee, and others as desired, depending on the flavor desired.

EXAMPLE 2

In the same manner as in Example 1, a concentrated alcohol liquid base having an alcohol level of 26% by volume is produced. Sixty-three grams of this base are mixed with about 35 to 45 grams (preferably about 40 grams) of sucrose and about 10 to 15 grams (preferably about 12 grams) of water. To this mixture can be added and mixed natural or synthetic flavoring agents such as cherry, raspberry, and others as desired to yield a 33-proof chambord-type liqueur product.

EXAMPLE 3

In the same manner as in Example 1, a concentrated alcohol liquid base having an alcohol level of 26% by volume is produced. Sixty-three grams of this base are mixed with about 45 to 55 grams (preferably about 50 grams) of sucrose and about 5 to 10 grams (preferably about 6 grams) of water, to which can be added and mixed coffee, chocolate mint, and other flavoring agents to produce a 33-proof liqueur product.

EXAMPLE 4

In the same manner as in Example 1, a concentrated alcohol liquid base having an alcohol level of 26% by volume is produced. Natural or synthetic flavoring agents such as chili, jalapeno, and others as desired can be mixed therewith to produce a 52-proof spicy liqueur product.

As is evident for the above Examples, the variety of liqueur products which can be produced by employing the process here described is significant. Thus, a wide array of products, limited only by flavor choices, can be made from a malt-based precursor.

While an illustrative and presently preferred embodiment of the invention has been described in detail herein, it is understood that the inventive concepts may be otherwise variously embodied and employed and that the appended claims are intended to be construed to include such variations except insofar as limited by the prior art.

What is claimed is:

1. A process for preparing a malt liqueur from a fermented wort produced from a mash initially comprising at least about 40 wt. % barley malt, the process comprising the sequential steps of:
   (a) filtering and treating the fermented wort to produce a liquid comprising alcohol and water which can be freeze concentrated;
   (b) sufficiently cooling the liquid to cause freeze concentration by freezing a portion of the water therein to thereby produce a quantity of ice crystals in the liquid and increase alcohol concentration of the liquid; and
   (c) separating the ice crystals from the liquid and mixing at least one flavoring agent and a sweetening agent into the liquid, wherein the flavoring agent is chosen from the group consisting of peach, pear, apple, pineapple, amaretto, orange, brandy, Irish coffee, cherry, raspberry, coffee, and chocolate mint.

2. A process for preparing a malt liqueur from a fermented wort produced from a mash initially comprising at least about 40 wt. % barley malt, the process comprising the sequential steps of:
   (a) filtering and treating the fermented wort to produce a liquid comprising alcohol and water which can be freeze concentrated;
   (b) sufficiently cooling the liquid to cause freeze concentration by freezing a portion of the water therein to thereby produce a quantity of ice crystals in the liquid and increase alcohol concentration of the liquid; and
   (c) separating the ice crystals from the liquid and mixing a spice flavoring agent into the liquid.

3. The process as claimed in claim 2 wherein the spice is chosen from the group consisting of chili and jalapeno.

* * * * *